United States Patent

[11] 3,626,005

| [72] | Inventors | John A. Scheben<br>Erlanger, Ky.;<br>Joseph M. Fisher; Irving L. Mador, both of<br>Cincinnati, Ohio |
|---|---|---|
| [21] | Appl. No. | 653,349 |
| [22] | Filed | July 14, 1967 |
| [45] | Patented | Dec. 7, 1971 |
| [73] | Assignee | National Distillers and Chemical Corporation<br>New York, N.Y. |

[54] PREPARATION OF UNSATURATED ACYL HALIDES
10 Claims, No Drawings

[52] U.S. Cl. ..................................................... 260/544 A,
260/468 CB, 260/469, 260/476 R, 260/486 AC,
260/514 C, 260/515 R, 260/539 R, 260/558 R,
260/561 N
[51] Int. Cl. ..................................................... C07c 51/58
[50] Field of Search ........................................... 260/486
AC, 544

[56] References Cited
UNITED STATES PATENTS

| 3,013,066 | 12/1961 | Alderson | 260/486 |
|---|---|---|---|
| 3,040,090 | 6/1962 | Alderson et al. | 260/486 X |
| 3,338,961 | 8/1967 | Closson et al. | 260/486 X |
| 3,349,119 | 10/1967 | Fenton et al. | 260/497 |
| 3,381,030 | 4/1968 | Biale et al. | 260/497 |
| 3,457,299 | 7/1969 | Closson et al. | 260/486 |

FOREIGN PATENTS

| 747,415 | 11/1966 | Canada | 260/497 |
|---|---|---|---|
| 39-12,916 | 1963 | Japan | 260/486 |

OTHER REFERENCES

Tsutsumi et al., " From Summaries of Lectures Presented in the 16 th Annual Meeting of the Chemical Society of Japan," pg. 458 (Mar. 31, 1963)

*Primary Examiner*—Lorraine A. Weinberger
*Assistant Examiner*—Paul J. Killos
*Attorney*—Allen A. Meyer, Jr.

ABSTRACT: A process for the preparation of unsaturated acyl halides by carbonylating vinylic halides in the presence of a Group VIII noble metal catalyst. Acryloyl chloride, for example, is formed by reacting vinyl chloride with carbon monoxide in the presence of a palladium metal catalyst at a temperature of from about 25° to 300° C., and a pressure from about 5 to 500 atmospheres.

PREPARATION OF UNSATURATED ACYL HALIDES

This invention relates to preparing unsaturated acyl halides. More particularly the invention pertains to the carbonylation of vinylic halides in the presence of Group VIII noble metal catalyst at elevated pressures and temperatures within the range of about 25° to 300° C., to obtain the corresponding unsaturated acyl halides.

The direct carbonylation of olefins to form saturated carboxylic acid derivatives such as saturated acyl halides is well known. J. Tsuji et al., Tetrahedron Letters, No. 22, pp. 1437–1440 (1963), Pergamon Press Ltd., disclosed that certain Group VIII noble metals and their halide salts have catalytic action on the carbonylation of olefins with carbon monoxide in an alcoholic solution of hydrogen chloride to produce saturated carboxylic acid esters. When halogenated olefins were employed as the starting material, the authors reported that reductive dehalogenation occurred concurrently with the carbonylation. Vinyl chloride yielded ethyl propionate as the main product and ethyl 2-chloro-propionate as a minor product, whereas the use of allyl chloride gave ethyl n- and iso-butyrate as well as ethyl 3-chloro-2-methylpropionate. Netherlands Pat. Application No. 6,408,476 [Chemical Abstracts, 63,499 (1965)] discloses that the carbonylation of vinyl chloride in the presence of palladium chloride and carbon tetrachloride resulted in the formation of 3,3-dichloropropionic acid and 3-chloroacrylic acid. The use of allyl chloride, on the other hand, produced 3-butenoic. A comparison of these reactions supports the well known proposition that a halogen atom is invariably deactivated by being joined to an ethylenic double bond. A further illustration of the difference between the reactivities of allylic and vinylic halides, such as allyl and vinyl chlorides, is the hydrolysis of 1,3-dichloro-1-propene to 3-chloro-2-propene-1-ol (R. Fuson and H. Snyder "Organic Chemistry" 2nd Edition, p. 272, John Wiley and Sons, Inc. N.Y., 1954):

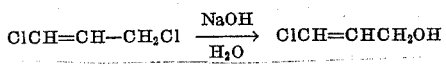

Thus, only the allylic halide was hydrolyzed.

The reactivity of allylic halides in carbonylation reactions has recently been disclosed in U.S. Pat. No. 3,309,403. Here allylic halides, e.g., allyl chloride, were reacted with carbon monoxide in the presence of a platinum group metal or metal halide catalyst to form the corresponding acyl halides. The general reaction is illustrated as follows:

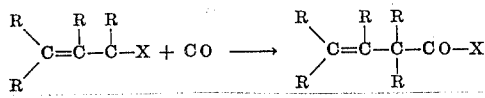

wherein X is chlorine or bromine and the R's are hydrogen, alkyl, aryl, cycloalkyl, or halogen. The fact that the allylic halides can be readily employed in carbonylation reactions is not surprising, since halides of the allyl and benzyl type are known to be highly reactive. L. Feiser and M. Feiser, "Advanced Organic Chemistry," pp. 341–343, Reinhold Publishing Corp., N.Y. (1961) have presented the following data relating to the reactivities of various unsaturated halides:

Reaction of NaI in Acetone (25° C.)

| Halogen Compound | Rate Constant (Mole $^{-1}$, hr.$^{-1}$) |
| --- | --- |
| CH≡CCH$_2$Br | 612 |
| CH$_2$=CHCH$_2$Br | 438 |
| CH$_2$=CHBr | 0.014 |
| CH$_2$=C=CHBr | 0.012 |
| CH$_3$CH=CHBr | 0.0005 |

The results show that although an allylic halide is very reactive; vinyl type halides, i.e. where the halogen atom is on an unsaturated carbon atom, are by contrast very unreactive. Consequently, the carbonylation of vinylic halides to obtain unsaturated acyl halides presents difficult problems which have not been resolved by the teachings of the prior art. It would be desirable therefore to have available an efficient process for the direct carbonylation of vinylic halides to produce unsaturated acyl halides which have numerous commercial applications.

One object of the present invention is to provide a process for the preparation of unsaturated acyl halides by the direct carbonylation of vinylic halides.

Another object of the present is to provide a process involving the reaction of vinylic halides with carbon monoxide wherein the dehalogenation and unreactivity problems encountered in the prior art processes are avoided.

A further object of the present invention is to provide an effective process for the preparation of acryloyl chloride by the carbonylation of vinyl chloride in liquid or vapor phase.

These and other objects of the present invention will become readily apparent from the ensuing description and illustrative embodiments.

In accordance with this invention vinylic halide has been found to react readily with carbon monoxide under the influence of a Group VIII noble metal catalyst to yield unsaturated acyl halides. For example, vinyl chloride has been reacted with carbon monoxide in the presence of a palladium metal catalyst to obtain acryloyl chloride. Although several of the above discussed prior art processes disclose the reaction of vinyl chloride with carbon monoxide, the process of this invention is basically different for the following reasons:

1. The products produced by the process of this invention are β,γ-unsaturated acyl halides.
2. The effective catalyst for the present process is a group VIII noble metal, such as platinum or palladium triad metals. In contrast to the teachings of the prior publications discussed above, group VIII noble metal compounds, e.g., noble metal halides, do not function as catalysts in the process of this invention.
3. The presence of hydrogen chloride is not essential to promote carbonylation reaction of this invention. When a group VIII noble metal halide, e.g. palladium chloride, is used as the carbonylation catalyst in the process of Tsuji et al., supra, it is reduced to the metal and the carbonylation reaction ceases. These authors stated the presence of both palladium chloride and hydrogen chloride is essential for their process.
4. The starting material for the present process is vinylic halides, i.e., β, γ-unsaturated halides, in contrast to allylic halides, i.e., γ, β-unsaturated halides employed in U.S. Pat. No. 3,309,403.

The carbonylation reaction of the present invention is indicated by the following general equation:

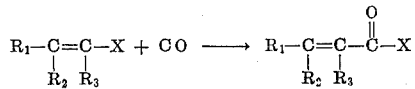

wherein X is a halogen, i.e., chlorine, bromine, or iodine; and R$_1$, R$_2$ and R$_3$ are hydrogen, alkyl each having from one to 16 carbon atoms, aryl having from six to 10 carbon atoms, cycloalkyl having from five to 10 carbon atoms, or halogen as defined above. Examples of typical starting materials include vinyl chloride, 2-chloro-1-propene, 1-chloro-1-propene, 1,2-dibromoethylene, trichloroethylene, tetrachloroethylene, 2,3-dichloro-1-propene, 1-cyclohexyl-2-chloroethylene, 1-chloro-1,3-butadiene, β-bromostyrene, and the like.

In general, the group VIII noble metal catalyst is selected from palladium platinum, ruthenium, rhodium, osmium, or iridium metals or mixtures thereof. It is also possible to employ a catalyst composition containing such noble metals as well as minor amounts of gold, silver, copper and the like. The preferred carbonylation catalyst for the present process is palladium metal, and this metal, as well as any of the other utilized, is generally supported on an inert carrier such as alumina, activated carbon, silica-alumina, silica gel, activated clays, etc.

For some purposes compounds known to complex with the group VIII noble metals or ions can also be employed as cocatalysts. Examples of such compounds include triphenyl phosphine, pyridine, benzonitrile, and pentane-1,3-dione. Only small amounts of such cocatalysts need by employed to obtain the desired effect. In general, the amounts of the cocatalyst may range from about 10 to 500 mol percent based on catalyst.

The reaction mixture will generally contain a molar excess of the carbon monoxide. The molar ratio of the vinylic halide to carbon monoxide may range from about 2:1 to 1:100, and preferably from about 1:1 to 1:80. The operating pressure may vary from about 5 to 500 atmospheres, preferably from about 30 to 200 atmospheres; while the reaction temperature may range from about 25° to 300° C., preferably from about 150° to 300° C.

As previously noted, the process of this invention can be carried out in either vapor or liquid phase. In the former method of operation vapors of vinylic halide and carbon monoxide, either fed separately or in admixture, are passed over the group VIII noble metal catalyst under the requisite pressure and temperature conditions. The resulting reaction product mixture is then treated, for example, by fractional distillation to separate the unsaturated acyl halide product therefrom. If desired, unreacted vinylic halide and carbon monoxide may be recycled to the reaction zone. Conventional procedures may also be employed for carrying out the process of this invention in the liquid phase. More particularly, the liquid vinylic halide and the catalyst are added to a suitable pressure reactor, pressured under a carbon monoxide atmosphere, and then heated to a temperature within the prescribed range while agitating the reaction mixture. The resulting reaction product mixture is removed from the pressure reactor, and the desired unsaturated acyl halide recovered therefrom by first filtering off the catalyst and fractionally distilling the filtrate to recover the acyl halide product. Unreacted vinylic halide, carbon monoxide, and diluent, if employed may be recovered subsequently and recycled.

Although it is not necessary to employ a solvent in carrying out the process of this invention because liquid vinylic halides act as their own solvents, the reaction may be carried out in the presence of certain diluents. Illustrative diluents include aliphatic or aromatic hydrocarbons such as mineral spirits, cyclohexane, benzene, and the like or mixtures thereof; aliphatic saturated chlorinated hydrocarbons such as dichloroethane, ethyl chloride, and the like or mixtures thereof. The above diluents are inert, i.e., they do not enter into the reaction. It is also possible, however, to employ alkanols having from about one to six carbon atoms as the diluent or to treat the unsaturated acyl halide in the filtrate. When the alkanols are employed for this purpose, the unsaturated acyl halide product is recovered as the corresponding ester. Typical alkanols which can be effectively employed include methanol, ethanol, t-butanol, cyclohexanol, and the like. Alternatively, the alkanol may be added subsequently to produce the ester. It is also possible to react the acyl halide in a subsequent step with water, ammonia or amine to yield the saturated acid or amide derivatives.

The invention will be more fully understood by reference to the following illustrative embodiments.

EXAMPLE 1

A suspension of 5 percent palladium on carbon catalyst (0.240 g. total, 0.11 mmoles of palladium) in 10 ml. of vinyl chloride (0.14 moles) was shaken and heated at 150° C. for 3.5 hours under 100 atmospheres of carbon monoxide pressure. At the end of the reaction period the product was treated with methanol to convert any acyl halide to its ester, methyl acrylate. The resulting reaction product mixture was filtered to recover the solid catalyst. Methyl acrylate was recovered from the filtrate by distillation and identified by gas chromatographic and mass spectral analyses. The yield of methyl acrylate, based on the amount of reacted vinyl chloride, was greater than 90 percent.

EXAMPLE 2

To a small pressure reactor was charged the following: 0.435 g. of 5 percent platinum on aluminum oxide (0.11 mmole platinum) and 10 ml. (0.14 moles) of vinyl chloride. The reactor was sealed and pressurized to 100 atmospheres with carbon monoxide. Then, the reactor contents were shaken and heated at 150° C. for 3.5 hours. Gas chromatographic analysis confirmed the presence of acryloyl chloride, after separation thereof from the reaction mixture as described in example 1. The yield of acryloyl chloride, based on the amount of reacted vinyl chloride, was greater than 90 percent.

EXAMPLE 3

A pressure reactor was loaded with 0.262 g. of 5 percent ruthenium on carbon catalyst (0.10 mmoles of ruthenium) and 10 ml. (0.14 mole) of vinyl chloride. Carbon monoxide was added to a pressure of 100 atmospheres. Finally, the reactor contents were shaken and heated at 150° C. for 12 hours. Analysis by gas chromatography verified the presence of acryloyl chloride.

EXAMPLE 4

To a mixture of 1.426 g. of 5 percent rhodium on alumina (0.07 mmole of rhodium) in 10 ml. (0.14 mole) of vinyl chloride in a 30 ml. pressure reactor was added carbon monoxide under 100 atmospheres pressure. The reactor was heated at 150° C. with shaking for 12 hours. The presence of acryloyl chloride was determined by gas chromatographic analysis.

EXAMPLE 5

The following were added to a 30 ml. pressure reactor: 0.240 g. of 5 percent palladium on carbon catalyst (0.11 mmole of palladium), 10 ml. (0.14 mole) of vinyl chloride and 5.0 ml. of methanol. Carbon monoxide was then added to a pressure of 100 atmospheres. The reactor contents were heated at 150° C. with shaking for 3.5 hours. Analysis of the reaction product by gas chromatography showed that methyl acrylate was formed.

EXAMPLE 6

A vapor mixture containing 5 percent vinyl chloride and 95 percent carbon monoxide was passed over a catalyst containing 2 percent palladium on 1/16inch alumina spheres. The reaction pressure was maintained at 68 atmospheres and the contact time varied between 1.6 to 9.2 seconds. Yields were generally better than 90 percent. Pertinent data is summarized below:

TABLE 1

| Reactor Temperature, ° C. | Contact time, sec. | Mmoles of acryloyl chloride [1] |
| --- | --- | --- |
| 224 | 5.2 | 2.9 |
| 226 | 2.4 | 7.5 |
| 260 | 3.2 | 7.3 |
| 260 | 9.2 | 5.4 |
| 300 | 3.6 | 18 |
| 301 | 1.6 | 16 |

[1] Per hr. per 100 g. catalyst.

EXAMPLE 7

Vinyl chloride was fed at various rates along with carbon monoxide under 68 atmospheres pressure into a preheater mixer maintained at 110° C. and then into a heated reactor containing 10 g. of 2 percent palladium plus 0.1 percent gold catalyst on aluminum oxide support. In each experiment the reaction product was analyzed by gas chromatography and found to contain acryloyl chloride. The yield was 95 percent or better. Table II below demonstrates this carbonylation under a variety of conditions, whereas table III shows the results obtained under similar reaction conditions utilizing a 2 percent palladium plus 0.4 percent catalyst on an aluminum oxide support.

TABLE II

| Reactor temperature, ° C. | Molar ratio, vinyl chloride/CO | Contact time, sec. | G. acryloyl chloride/g. Pd/24 hours |
|---|---|---|---|
| 183 | 0.11 | 6.7 | 4.0 |
| 180 | 0.26 | 7.2 | 10.6 |
| 221 | 0.11 | 6.3 | 4.1 |
| 221 | 0.27 | 7.4 | 23.0 |
| 211 | 0.27 | 4.7 | 12.0 |
| 219 | 0.67 | 12.7 | 28.0 |

TABLE III

| Reactor temperature, ° C. | Molar ratio, vinyl chloride/CO | Contact time, sec. | G. acryloyl chloride/g. Pd/24 hours |
|---|---|---|---|
| 203 | 0.21 | 6.4 | 21.9 |
| 203 | 0.25 | 6.2 | 35.8 |
| 203 | 0.38 | 8.1 | 20.8 |
| 203 | 0.54 | 8.7 | 19.1 |

EXAMPLE 8

A suspension of 0.513 g. of 2 percent palladium (0.096 mmoles of palladium) plus 0.3 percent gold on alumina support in 10 ml. (0.09 moles) of 2,3-dichloro-1-propene was shaken and heated at 150° C. for 18 hours under 88.4 atmospheres or carbon monoxide pressure. Then, the catalyst was removed by filtration. The filtrate was treated with methanol to convert the acid halide product into its methyl ester. Analyses by gas chromatography and mass spectral methods found the sample to contain methyl 3-chloro-2-methylene propionate.

EXAMPLE 9

1,3-Dichloropropene (0.09 moles) and a 2 percent palladium plus 0.3 percent gold catalyst (0.096 mmoles of palladium) on alumina support were charged to a 30 ml. pressure reactor. Carbon monoxide was then added to a pressure of 95 atmospheres. The reactor contents were shaken and heated at 150° C. for 25 hours. The product 4-chloro-2-butenoyl chloride was identified by gas chromatographic and mass spectral analyses.

The above data shows that the process of this invention can be effectively employed to prepare unsaturated acyl halides by the carbonylation of vinylic halides. When alkanols are utilized in the reaction mixture or added to the reaction product mixture following separation of the catalyst, the unsaturated acyl halides are converted to their corresponding esters. The data also demonstrate that a variety of group VIII noble metal catalysts as such or in combination with a minor amount of gold are effective in this process, and that the use of a palladium metal containing a catalyst is especially preferred.

While particular embodiments of this invention are illustrated above, it will be understood that the invention is obviously subject to variations and modifications without departing from its broader aspects.

We claim:
1. A process for the preparation of alpha, beta-unsaturated acyl halides which consists essentially of:
   1. reacting:
      a. a vinylic halide of the formula

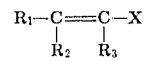

wherein X represents chlorine, bromine, or iodine, and wherein $R_1$, $R_2$ and $R_3$ individually represent hydrogen, alkyl of from one to 16 carbon atoms, aryl of from six to 10 carbon atoms, cycloalkyl of from five to 10 carbon atoms, chlorine, bromine, or iodine, with
      b. carbon monoxide, in the presence of
      c. a palladium, platinum, ruthenium, rhodium, osmium or iridium group VIII noble metal at a pressure of from five to 500 atmospheres and at a temperature of from 25° to 300° C., and wherein the molar ratio of the vinylic halide to carbon monoxide is in the range of from about 2:1 to 1:100, and
   2. recovering the alpha, beta-unsaturated acyl halide thus produced.

2. The process of claim 1 wherein said vinylic halide is vinyl chloride.

3. The process of claim 1 wherein said vinylic halide is 1,3-dichloro-1-propene.

4. The process of claim 1 wherein said group VIII noble metal is supported on an inert carrier.

5. The process of claim 1 wherein said group VIII noble metal is palladium.

6. The process of claim 5 wherein said palladium is combined with a minor amount of gold.

7. The process of claim 1 wherein the vinylic halide in liquid phase is reacted with the carbon monoxide.

8. The process of claim 1 wherein vinylic halide in vapor phase is reacted with the carbon monoxide.

9. A process for the preparation of acryloyl chloride which consists essentially of reacting vinyl chloride with carbon monoxide at a pressure of from about five to 500 atmospheres and a temperature of from about 150° to 300° C. in the presence of a palladium metal catalyst, and separating acryloyl chloride from the resulting reaction product mixture.

10. The process of claim 9 wherein said palladium metal contains a minor amount of gold.

* * * * *